Figures 1, 2:
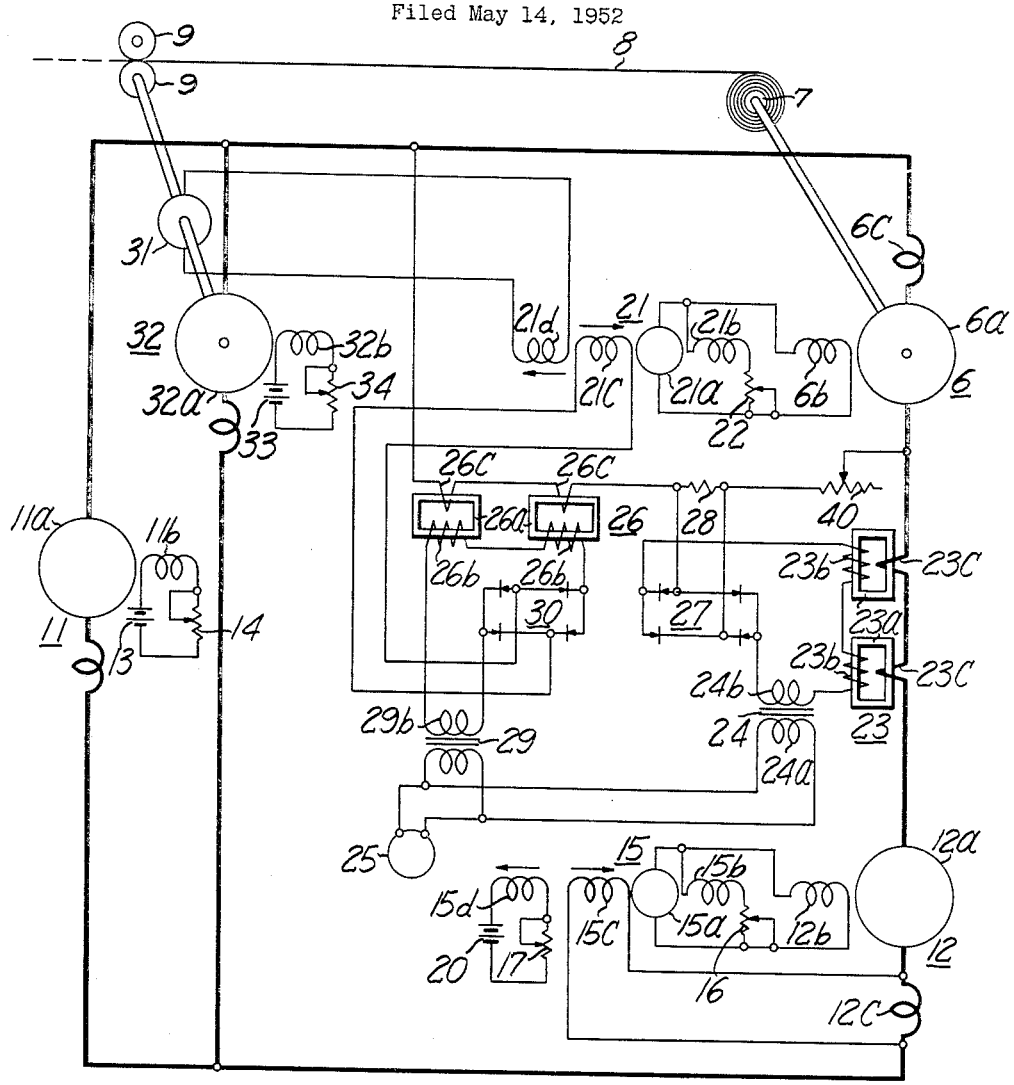

March 27, 1956 T. B. MONTGOMERY 2,740,079
DYNAMOELECTRIC MACHINE SPEED CONTROL SYSTEM
Filed May 14, 1952

Inventor
Terryl B. Montgomery
by Walter L. Miller Jr.
Attorney

United States Patent Office 2,740,079
Patented Mar. 27, 1956

2,740,079
DYNAMOELECTRIC MACHINE SPEED CONTROL SYSTEM

Terryl B. Montgomery, Wauwatosa, Wis., assignor to Allis-Chalmers Manufacturing Company, Milwaukee, Wis.

Application May 14, 1952, Serial No. 287,773

5 Claims. (Cl. 318—308)

This invention relates in general to electric measuring systems and in particular to systems for measuring and/or controlling the induced electromotive force of a dynamoelectric machine.

It is well known to utilize the induced electromotive force of an electric motor as a measure of the motor speed, and many systems have been developed for providing an electrical measure of this electromotive force, which is commonly designated counter electromotive force. Some of such systems utilize a potentiometer connected across the terminals of the motor armature winding to obtain a measure of the terminal voltage of the machine, and utilize the voltage drop across the motor interpole winding to obtain a measure of the motor current and motor IR drop, the difference between the two voltages thus derived being a measure of the motor counter electromotive force.

However, these systems have the disadvantage that the potentiometer is not too accurate and uses a considerable amount of power, thus rendering the system inefficient. An additional disadvantage of such systems is that the voltage obtained across the interpole winding varies with changes in the motor temperature, thereby rendering some time of temperature compensation necessary for accurate control. Also, voltages induced in the interpole winding because of the transformer action between the armature winding and interpole winding may adversely affect the accuracy of the system. One of the most important disadvantages of such systems is that the control equipment is connected directly to the high voltage, high current power circuit, thereby rendering the equipment hazardous. Additionally, the voltage drop obtained across the interpole winding is small and requires that a control field winding of large size wire with its consequent space requirements be utilized to provide a sufficient control magnetomotive force.

These disadvantages may be overcome by utilizing means which are not subject to temperature errors, do not consume excessive power, which provide insulation between the power circuit and the control equipment, and which permit the use of the control field winding of the optimum size. The most suitable devices for use in such a system are saturable reactors having their control windings energized in dependence upon the current and voltage of the machine armature winding and having their reactance windings connected to produce an output voltage which is a measure of the induced electromotive force of the machine. This arrangement is adapted to measure the induced electromotive force of generators as well as of motors.

It is therefore an object of this invention to provide a system for measuring the induced electromotive force of a dynamoelectric machine in which the measuring equipment is isolated from the power circuits.

It is a further object of the present invention to provide a system for measuring the counter electromotive force of a dynamoelectric machine which is substantially independent of the effect of temperature changes of the machine.

It is an additional object of this invention to provide an improved constant power electrical drive system.

Objects and advantages other than those set forth above will be apparent from the following description when read in connection with the accompanying drawing, in which:

Fig. 1 diagrammatically illustrates the circuits and apparatus of the preferred embodiment of the invention utilized in connection with a motor driving a reel upon which strip material is wound, and Fig. 2 partially illustrates an alternate embodiment of the invention.

Referring to the drawing by character of reference, Fig. 1 illustrates one embodiment of the invention utilized in connection with the control of a dynamoelectric machine 6. Machine 6 may be of any suitable known type such as a direct current motor having an armature winding 6a, a field winding 6b and an interpole winding 6c. Motor 6 may drive any suitable load such as a reel 7 upon which a strip 8 of material is wound after being processed by work devices in the form of rolls 9 of one stand of a metal rolling mill.

Armature winding 6a is supplied with current from any suitable controllable source such as a main generator 11 and a booster generator 12, the armature windings 11a, 12a of which are serially connected with armature winding 6a. Main generator 11 is provided with a field winding 11b supplied with current from a battery 13 through an adjustable resistor 14. Booster generator 12 is provided with a field winding 12b and an interpole winding 12c. Field winding 12b is supplied with current from the armature 15a of an exciter generator 15 having a self-excited field winding 15b and a pair of differentially acting control field windings 15c, 15d. Field winding 15b is connected across armature 15a in series with an adjustable resistor 16. Field winding 15c is connected across interpole winding 12c to be energized in dependence upon the current flowing in armature winding 6a, and field winding 15d is connected to a battery 20 through an adjustable resistor 17.

Field winding 6b of motor 6 may be supplied with current from the armature 21a of an exciter generator 21 having a self-excited field winding 21b connected across armature 21a through an adjustable resistor 22, and a pair of differentially acting control field windings 21c, 21d. Field winding 21c is connected to be energized in dependence upon the counter electromotive force of motor 6 through suitable electrical insulating means. Such means may comprise a first saturable reactor 23 having a pair of saturable cores 23a, a reactance winding 23b and a control winding 23c. Control winding 23c is connected in series with armature winding 6a to vary the reactance of reactance winding 23b in response to variations in the current flowing in armature winding 6a.

Reactance winding 23b is supplied with current through the secondary winding 24b of a transformer 24 having a primary winding 24a connected to an alternator 25. Reactance winding 23b is connected to a second saturable reactor 26 through suitable means such as a full wave rectifier 27 having its alternating current terminals connected to reactance winding 23b and secondary winding 24b and having its direct current terminals suitably connected to a resistor 28. Rectifier 27 thus impresses on resistor 28 a voltage of the desired polarity having a magnitude dependent upon the current flowing in armature winding 6a. There is thus impressed across a first pair of terminals (the terminals of resistor 28) a first unidirectional control voltage proportional to the current in armature winding 6a.

A second pair of terminals (the terminals embracing armature winding 6a and interpole winding 6c), have impressed thereon the terminal voltage of motor 6 as a second control voltage. Saturable reactor 26 is provided with a pair of saturable cores 26a, a reactance winding 26b and a control winding 26c. Control winding 26c is connected across the terminals of armature winding 6a in series with resistor 28 and an adjustable resistor 40, the polarities of armature 6a and of rectifier 27 being such that the voltage of resistor 28 subtracts from the terminal voltage of machine 6 when the machine is a motor, as in this embodiment. Since the magntude of the voltage across resistor 28 is dependent upon the current flowing through armature winding 6a and is therefore a measure of the IR drop in armature winding 6a, the voltage impressed on control winding 26c is proportional to the counter electromotive force of motor 6. Reactance winding 26b is connected to field winding 21c through a secondary winding 29b of a transformer 29 and a full wave rectifier 30, to impress on field winding 21c a voltage which is a measure of the counter electromotive force of motor 6. Control winding 21c is thus inductively connected to armature 6a to be electrically isolated therefrom and to respond to the counterelectromotive force thereof.

Field winding 21d is connected to be energized in dependence upon the speed of strip 8, and may be connected to the terminals of a tachometer generator 31. Generator 31 is driven by a motor 32 which drives roll 9 of the mill. Motor 32 has an armature winding 32a supplied with current from armature winding 11a and has a field winding 32b supplied with current from a battery 33 through an adjustable resistor 34. Field windings 21b, 21c, 21d have for their purpose to control the operation of motor 6. As is well known, it is a matter of choice to provide such windings on exciter 21, or on a subexciter, or on motor 6.

In operation, it is desired to maintain the tension in strip 8 substantially constant as the strip is wound on reel 7. This necessitates increasing the torque of motor 6 and reducing the rotational speed of the reel as the strip builds up, to maintain constant strip tension and constant linear speed of the strip. After the end of strip 8 has been secured to reel 7 by suitable known means, such as a belt wrapper (not shown), and assuming that all circuits are energized, the magnetomotive force of field winding 15d exceeds the magnetomotive force of field winding 15c to increase the voltage of armature 15a to thus increase the voltage of armature winding 12a. The voltage of armature winding 12a is cumulative with respect to the voltage of armature 11a so that this voltage increase increases the current supplied to armature winding 6a. The current of armature winding 6a increases until the magnetomotive force produced in field winding 15c by the voltage drop across interpole winding 12c is equal to the magnetomotive force of differentially acting field winding 15d. The energization of field winding 15d is adjusted through resistor 17 in dependence upon the desired tension of strip 8. Assuming that resistor 16 is adjusted so that self-excited field winding 15b supplies all of the excitation required to maintain the voltage of armature winding 15a at any given value, field winding 15b then supplies the excitation required to maintain constant the current in armature winding 6a.

Simultaneously with the increase in current in armature winding 6a to the desired value, exciter generator 21 maintains the counter electromotive force of motor 6 at a substantially constant value determined by the linear speed of strip 8 as measured by tachometer generator 31. When the strip is secured to reel 7, motor 6 is running with "weak field," that is, with a minimum excitation of field winding 6b. The magnetomotive force of field winding 21d exceeds the magnetomotive force of field winding 21c so that field winding 21d causes the voltage of armature 21a to increase to thereby increase the energization of field winding 6b and consequently increase the counter electromotive force of motor 6. The counter electromotive force of motor 6 increases until the energization of field winding 21c supplied by counter electromotive force measuring saturable reactors 23, 26 produces a magnetomotive force in field winding 21c equal to the reference magnetomotive force of field winding 21d. Assuming that resistor 22 is adjusted so that field winding 21b supplies all of the excitation required to maintain thhe voltage of armature 21a at any given value, field winding 21b maintains the voltage of armature 21 at the value required to maintain a constant counter electromotive force of motor 6.

As the strip starts winding on reel 7, the current in armature winding 6a tends to increase above the predetermined constant value. However, this increase is opposed by the balancing action of field windings 15c, 15d which cause the voltage of booster generator armature winding 12a to decrease to thereby decrease the terminal voltage of motor 6 until the armature winding current decreases to the desired value. This decrease of terminal voltage of motor 6, for a given energization of field winding 6b, causes the counter electromotive force of motor 6 to decrease below the desired value. Therefore, the energization of field winding 21d exceeds the energization of field winding 21c to cause the energization of field winding 6b to increase until the counter electromotive force of motor 6 returns to the desired value.

Thus, as the strip builds up on reel 7, there is a continuous regulating action by generators 15, 21 to maintain constant armature winding current and constant counter electromotive force of motor 6. The response of one of the exciter generators is preferably slowed with respect to the response of the other exciter generator so as to avoid hunting between the two machines. From the foregoing, it will be seen that as the strip builds up on reel 7, the energization of field winding 6b is increased to provide the increased torque and reduced rotational speed of motor 6 required to maintain constant tension and constant linear strip speed with reel buildup. Thus, the system operates as a constant power drive for reel 7.

Fig. 2 partially illustrates an alternate embodiment of the invention identical to the embodiment of Fig. 1 except for the connection of saturable reactors 23, 26. In Fig. 2, control winding 26c is connected directly across the terminals of armature winding 6a to vary the reactance of reactance winding 26b in response to variations in the terminal voltage of motor 6. The direct current terminals of rectifier 30 impress on a resistor 36 a voltage having a magnitude dependent upon the magnitude of the terminal voltage of motor 6. Reactance winding 23b is connected to reactor 26 by having an adjustable resistor 37, which has impressed thereon a voltage dependent upon the current in armature winding 6a, connected in series with resistor 36 and control field winding 21c. Owing to the polarities of rectifiers 27, 30, the voltage of resistor 37 subtracts from the voltage of resistor 36 to impress on control field winding 21c a resultant voltage having a magnitude dependent upon the counter electromotive force of armature winding 6a. Thus a first pair of terminals (the terminals of resistor 37) have impressed thereacross a first unidirectional control voltage proportional to the motor armature current, and a second pair of terminals (the terminals of resistor 36) have impressed thereacross a second control voltage proportional to the terminal voltage of the motor. Thus, the embodiment of Fig. 2 operates similarly to the system of Fig. 1 to provide a measure of the counter electromotive force of motor 6 during winding of the strip. Control winding 21c is thus inductively connected to the motor armature to be electrically isolated therefrom and to respond to the counterelectromotive force thereof.

Although but two embodiments have been illustrated and described, it will be apparent to those skilled in the art that various changes and modifications may be made therein without departing from the spirit of the invention or from the scope of the appended claims.

It is claimed and desired to secure by Letters Patent:

1. In a control system for a dynamoelectric machine having an armature winding and a field winding, the system having an exciter for energizing the field winding and a control field winding for the exciter, the combination comprising first and second pairs of terminals, first and second saturable reactors for electrically isolating said control field winding from said armature winding, said first saturable reactor having a first control winding and a first reactance winding, means connecting said first control winding in series with said armature winding, means including a source of alternating current for connecting said first reactance winding to said first pair of terminals for impressing thereacross a first unidirectional control voltage having a magnitude proportional to the magnitude of the current in said armature winding, said second saturable reactor having a second control winding and a second reactance winding, means connecting said second control winding across said armature winding, means including said source of alternating current for connecting said second reactance winding across said second pair of terminals for impressing thereacross a second control voltage having a magnitude proportional to the magnitude of the voltage of said dynamoelectric machine, means serially connecting said pairs of terminals and said control field winding for opposing said first and second control voltages to impress on said control field winding a third control voltage having a magnitude dependent upon the magnitude of the difference between said first and second control voltages, the magnitudes of said first and second control voltages being so proportioned that said control field winding is energized in accordance with the induced electromotive force of said dynamoelectric machine.

2. In a control system for a dynamoelectric machine having an armature winding and a field winding, the system having an exciter for energizing the field winding and a control field winding for the exciter, the combination comprising first and second pairs of terminals, a first saturable reactor having a first control winding and a first reactance winding, means connecting said first control winding in series with said armature winding, means including a source of alternating current for connecting said first reactance winding to said first pair of terminals for impressing thereacross a first unidirectional control voltage having a magnitude proportional to the magnitude of the current in said armature winding, means connecting said armature winding across said second pair of terminals for impressing thereacross a second control voltage having a magnitude proportional to the magnitude of the voltage of said dynamoelectric machine, a second saturable reactor for electrically isolating said control field winding from said armature winding and having a second control winding and a second reactance winding, means serially connecting said second control winding to said pairs of terminals for opposing said first and second control voltages to impress on said second control winding a third control voltage having a magnitude dependent upon the magnitude of the difference between said first and second control voltages, means including said source of alternating current for connecting said second reactance winding to said control field winding for impressing on said control field winding a voltage having a magnitude dependent upon the magnitude of said third control voltage, the magnitudes of said first and second control voltages being so proportioned that said control field winding is energized in accordance with the induced electromotive force of said dynamoelectric machine.

3. In a control system for a dynamoelectric machine having an armature winding and a field winding, the system having an exciter for energizing the field winding and a control field winding for the exciter, the combination comprising first and second saturable reactors for electrically isolating said control field winding from said armature winding, said first saturable reactor having a first control winding and a first reactance winding, means connecting said first control winding in series with said armature winding, a first resistor, a source of alternating current, a first full wave rectifier having its alternating current terminals connected to said first reactance winding through said source and having its direct current terminals connected across said first resistor for impressing thereacross a first unidirectional control voltage having a magniture proportional to the magnitude of the current in said armature winding, said second saturable reactor having a second control winding and a second reactance winding, means connecting said second control winding across said dynamoelectric machine, a second resistor, a second full wave rectifier having its alternating current terminals connected through said source to said second reactance winding and having its direct current terminals connected across said second resistor for impressing thereacross a second control voltage having a magnitude proportional to the magnitude of the voltage of said dynamoelectric machine, means serially connecting said first and second resistors and said control field winding for opposing said first and second control voltages to impress on said control field winding a third voltage having a magnitude dependent upon the magnitude of the difference between said first and second control voltages, the magnitud of said first and second control voltages being so proportioned that said control field winding is energized in accordance with the induced electromotive force of said dynamoelectric machine.

4. In a control system for a dynamoelectric machine having an armature winding and a field winding, the system having an exciter for energizing the field winding and a control field winding for the exciter, the combination comprising a first saturable reactor having a first control winding and a first reactance winding, means connecting said first control winding in series with said armature winding, a resistor, a source of alternating current, a first full wave rectifier having its alternating current terminals connected to said first reactance winding through said source and having its direct current terminals connected across said resistor for impressing thereacross a first unidirectional control voltage having a magnitude proportional to the magnitude of the current in said armature winding, a second saturable reactor for electrically isolating said control field winding from said armature winding and having a second control winding and a second reactance winding, means connecting said second control winding to said resistor and to said armature winding for opposing said first control voltage and the voltage of said dynamoelectric machine to impress on said second control winding a second control voltage having a magnitude dependent upon the magnitude of the difference between the voltage of said dynamoelectric machine and said first control voltage, a second full wave rectifier having its alternating current terminals connected to said second reactance winding through said source and having its direct current terminals connected across said control field winding for impressing on said control field winding a third control voltage having a magnitude dependent upon the magnitude of said second control voltage, the magnitudes of said first control voltage and of the voltage of said dynamoelectric machine being so proportioned that said control field winding is energized in accordance with the induced electromotive force of said dynamoelectric machine.

5. In a control system for a dynamoelectric machine having an armature winding and a field winding, the system having an exciter for energizing the field winding and a control field winding for the exciter, the combination of a first pair of terminals and first means for producing thereacross a first unidirectional control voltage having a magnitude proportional to the magnitude of the current in said armature winding, a second pair of terminals and second means for producing thereacross a second control voltage having a magnitude proportional to the magnitude of the voltage of said dynamoelectric machine, means serially connecting said pairs of terminals for opposing said control voltages, and means including said first and second means inductively connecting said control field winding to said armature winding through said pairs of terminals for electrically isolating said control field winding from said armature winding and for impressing on said control field winding a voltage having a magnitude dependent upon the magnitude of the difference between said control voltages, the magnitudes of said first and second control voltages being so proportioned that said control field winding is energized in accordance with the induced electromotive force of said dynamoelectric machine.

References Cited in the file of this patent

UNITED STATES PATENTS

| | | |
|---|---|---|
| 2,121,588 | Eames | June 21, 1938 |
| 2,286,370 | Miller | June 16, 1942 |
| 2,451,901 | Auburn | Oct. 19, 1948 |
| 2,504,105 | Bendz | Apr. 18, 1950 |
| 2,558,086 | Herchenroeder | June 26, 1951 |
| 2,558,094 | King | June 26, 1951 |